US010296555B1

(12) United States Patent
Zhang et al.

(10) Patent No.: US 10,296,555 B1
(45) Date of Patent: May 21, 2019

(54) METHODS, SYSTEMS, AND COMPUTER READABLE MEDIA FOR NON-PARAMETRIC DEPENDENCE DETECTION USING BITWISE OPERATIONS IN A COMPUTING SYSTEM

(71) Applicants: The University of North Carolina at Chapel Hill, Chapel Hill, NC (US); THE BOARD OF TRUSTEES OF THE LELAND STANFORD JUNIOR UNIVERSITY, Palo Alto, CA (US); TEMPLE UNIVERSITY - OF THE COMMONWEALTH SYSTEM OF HIGHER EDUCATION, Philadelphia, PA (US)

(72) Inventors: Kai Zhang, Chapel Hill, NC (US); Michael Thomas Max Baiocchi, Redwood City, CA (US); Zhigen Zhao, Ambler, PA (US)

(73) Assignees: The University of North Carolina at Chapel Hill, Chapel Hill, NC (US); The Board of Trustees of the Leland Stanford Junior University, Palo Alto, CA (US); Temple University—Of the Commonwealth System of Higher Education, Philadelphia, PA (US)

( * ) Notice: Subject to any disclaimer, the term of this patent is extended or adjusted under 35 U.S.C. 154(b) by 0 days.

(21) Appl. No.: 15/926,162

(22) Filed: Mar. 20, 2018

(51) Int. Cl.
*G06K 9/62* (2006.01)
*G06F 17/15* (2006.01)
*G06F 17/18* (2006.01)

(52) U.S. Cl.
CPC ............. *G06F 17/15* (2013.01); *G06F 17/18* (2013.01); *G06K 9/6268* (2013.01)

(58) Field of Classification Search
None
See application file for complete search history.

(56) References Cited

U.S. PATENT DOCUMENTS

2010/0312812 A1* 12/2010 Wang ...................... G06F 7/485
 708/505
2011/0213818 A1* 9/2011 Lundvall ............. G06F 9/30014
 708/209

OTHER PUBLICATIONS

Benjamini et al., "Controlling the False Discovery Rate: A Practical and Powerful Approach to Multiple Testing," Journal of the Royal Statistical Society, Series B, vol. 57, No. 1, pp. 289-300 (1995).

(Continued)

*Primary Examiner* — Michael D. Yaary
(74) *Attorney, Agent, or Firm* — Jenkins, Wilson, Taylor & Hunt P.A.

(57) ABSTRACT

Methods, systems, and computer readable media for non-parametric dependence detection using bitwise operations in a computing system are disclosed. One method for non-parametric dependence detection using bitwise operations in a computing system includes receiving a set of p variables, wherein p represents an integer greater than or equal to two. The method also includes generating a set of binary interaction designs (BIDs) using a depth value d and bitwise operations, wherein each of the set of BIDs indicates a dependence structure based on arrangement of partitions in the respective BID. The method further includes determining, using the BIDs generated using bitwise operations in a computing system, non-parametric dependence between the set of p variables. The method also includes performing data analysis involving the set of p variables using the non-parametric dependence between the set of p variables. The method further includes generating output related to the data analysis.

20 Claims, 12 Drawing Sheets

(56) References Cited

OTHER PUBLICATIONS

Fan et al., "Sure Independence Screening for Ultra-High Dimensional Feature Space," pp. 1-38 (Aug. 8, 2007).
Galton, "Regression Towards Mediocrity in Hereditary Stature," The Journal of the Anthropological Institute of Great Britain and Ireland, vol. 15, pp. 246-263 (1886).
Gretton et al., "Consistent Nonparametric Tests of Independence," Journal of Machine Learning Research, vol. 11, pp. 1391-1423 (2010).
Gretton et al., "Measuring Statistical Dependence with Hilbert-Schmidt Norms," ALT, vol. 16, pp. 63-78 (2005).
Hoeffding, "A Non-Parametric Test of Independence," The Annals of Mathematical Statistics, vol. 19, No. 4, pp. 546-557 (Dec. 1948).
Ma et al., "Fisher Exact Scanning for Dependency," arXiv preprint arXiv:1608.07885, pp. 1-57 (May 3, 2017).
Pearson, "Note on Regression and Inheritance in the Case of Two Parents," Proceedings of the Royal Society of London, vol. 58, pp. 240-242 (1895).
Rukhin et al., "A Statistical Test Suite for Random and Pseudorandom Number Generators for Cryptographic Applications," Computer Security, pp. 1-131 (2001).
Schweizer et al., "On Nonparametric Measures of Dependence for Random Variables," The Annals of Statistics, vol. 9, No. 4, pp. 879-885 (1981).
Szekely et al., "Measuring and Testing Dependence by Correlation of Distances," The Annals of Statistics, vol. 35, No. 6, pp. 2769-2794 (2007).
Wikipedia, "Correlation and Dependence," pp. 1-8 (Edited Apr. 21, 2018).
Zhang, "Bet on Independence," arXiv preprint arXiv:1610.05246, pp. 1-36 (Nov. 21, 2017).

* cited by examiner

METHODS, SYSTEMS, AND COMPUTER READABLE MEDIA FOR NON-PARAMETRIC DEPENDENCE DETECTION USING BITWISE OPERATIONS IN A COMPUTING SYSTEM

GOVERNMENT INTEREST

This invention was made with government support under Grant Nos. DMS-1613112, IIS-1633212, and IIS-1633283 awarded by the National Science Foundation. The government has certain rights in the invention.

TECHNICAL FIELD

The subject matter described herein relates to computer processing and data analysis. More specifically, the subject matter relates to methods, systems, and computer readable media for non-parametric dependence detection using bitwise operations in a computing system.

BACKGROUND

Computer-based data analysis is a significant driver in today's economy. For example, various machine learning techniques and algorithms, e.g., deep learning and neural network algorithms, may attempt to process or analyze data and identify or derive useful information, relationships, and/or conclusions about the data being analyzed. In this example, by identifying or deriving information about input data, such machine learning techniques and algorithms may be deployed to solve or handle numerous applications (e.g., playing Go, chess, or other games, medical diagnosis, and/or autonomous driving).

In various applications or uses, computer-based data analysis may use detected or assumed relationships between input data or variables. For example, computer-based data analysis may attempt to detect dependence (or a related dependence structure) between a given set of variables. One significant achievement in detecting dependence between variables occurred in the 1880s when Francis Galton introduced a statistical method known as linear regression to study if two variables are linearly associated. This line of inquiry gave rise to a well-known statistic, the Pearson correlation coefficient, which quantifies a linear association between variables. Although widely used in various applications, the linearity assumption is problematic, particularly limiting in the complex, exploratory "Big Data" era when the dependence between variables can be arbitrary (e.g., non-linear). Consequently, there has been a dramatic increase in researching techniques for identifying non-linear dependence between variables.

SUMMARY

Methods, systems, and computer readable media for non-parametric dependence detection using bitwise operations in a computing system are disclosed. One method for non-parametric dependence detection using bitwise operations in a computing system includes receiving a set of p variables, wherein p represents an integer greater than or equal to two. The method also includes generating a set of binary interaction designs (BIDs) using a depth value d and bitwise operations, wherein each of the set of BIDs indicates a dependence structure based on arrangement of partitions in the respective BID. The method further includes determining, using the BIDs generated using bitwise operations in a computing system, non-parametric dependence between the set of p variables. The method also includes performing data analysis involving the set of p variables using the non-parametric dependence between the set of p variables. The method further includes generating output related to the data analysis.

A system for non-parametric dependence detection using bitwise operations in a computing system is also disclosed. The system includes a computing system comprising at least one processor and a dependence detection module (DDM) implemented using the at least one processor. The DDM is configured for: receiving a set of p variables, wherein p represents an integer greater than or equal to two; generating a set of BIDs using a depth value d and bitwise operations, wherein each of the set of BIDs indicates a dependence structure based on arrangement of partitions in the respective BID; determining, using the BIDs generated using bitwise operations in a computing system, non-parametric dependence between the set of p variables; performing data analysis involving the set of p variables using the non-parametric dependence between the set of p variables; and generating output related to the data analysis.

The subject matter described herein can be implemented in software in combination with hardware and/or firmware. For example, the subject matter described herein can be implemented in software executed by at least one processor. In one example implementation, the subject matter described herein may be implemented using at least one computer readable medium having stored thereon computer executable instructions that when executed by at least one processor of a computer cause the computer to perform steps. Exemplary computer readable media suitable for implementing the subject matter described herein include non-transitory devices, such as disk memory devices, chip memory devices, programmable logic devices, and application specific integrated circuits. In addition, one or more computer readable media that implements the subject matter described herein may be located on a single device or computing platform or may be distributed across multiple devices or computing platforms.

As used herein, the terms "node" and "host" refer to a physical computing platform or device including one or more processors and memory.

As used herein, the terms "function" and "module" refer to software in combination with hardware and/or firmware for implementing features described herein.

BRIEF DESCRIPTION OF THE DRAWINGS

Some embodiments of the subject matter described herein will now be explained with reference to the accompanying drawings, wherein like reference numerals represent like parts, of which.

DETAILED DESCRIPTION

Figure 1:
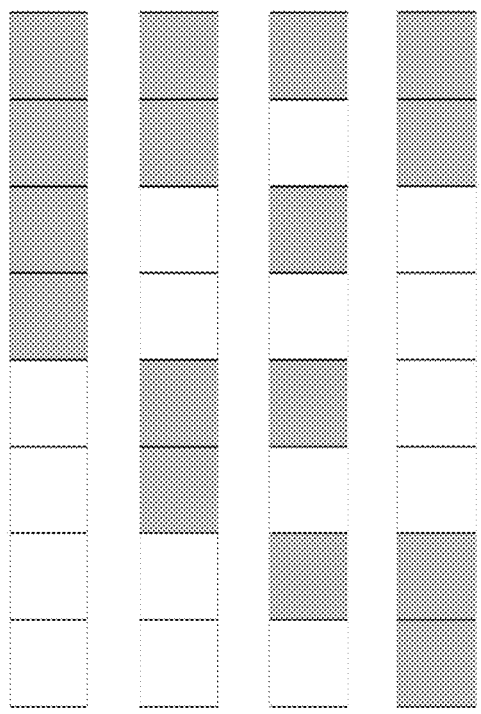
FIG. 1 depicts multiple example one-dimensional configurations for a binary interaction design generated using bitwise operations.

The subject matter described herein relates to methods, systems, and computer readable media for non-parametric dependence detection using bitwise operations in a computing system. Binary Expansion Testing (BET) is a recently developed framework for testing independence between two variables. The advantages of this framework include the following: (a) the filtration approach avoids the common problem of non-uniform consistency and achieves the optimal rate in sample complexity; (b) the interaction of Bernoulli variables in the binary expansion provides clear interpretation of the dependence [Zhang (2016)].

In accordance with some aspects of the subject matter described herein, techniques, methods, systems, or mechanisms are disclosed for non-parametric dependence detection using bitwise operations in a computing system. For example, a bitwise-based dependence-detection (BDD) framework may detect dependence between multiple variables (e.g., multivariate cases). In some embodiments, an example approach may perform distribution-free detection of dependence among p variables, $X_1, X_2, \ldots, X_p$ by examining the relation between the joint cumulative distribution function $F_{X_1, \ldots, X_p}(x_1, \ldots, x_p)$ and all the marginal cumulative distribution functions $F_{X_i}(x_i)$. In such embodiments, this generalization can allow for efficient detection of complicated dependence structure in various applications, e.g., 'Big Data' scenarios.

In accordance with some aspects of the subject matter described herein, techniques, methods, systems, or mechanisms are disclosed for calculating a dependence related statistic based on bitwise operations. For example, an algorithm described herein may include calculating a statistic that uses bitwise operations to identify whether a set of variables are dependent (or independent). In this example, one notable feature of the example algorithm is that it directly operates over data bits in the calculation of such statistics. As a result of this bitwise implementation, the algorithm can be orders of magnitude faster than existing methods. Advantageous, such an algorithm is believed novel since the inventors are unaware of any other existing statistical method implemented in a similar bitwise manner. Further, since the complexity of this example algorithm is 0(n log(n)), determined by the sorting step when calculating the empirical cdf function for each variable, the example algorithm can scale to a suitably large sample size (see Section 3 for more details).

In accordance with some aspects of the subject matter described herein, techniques, methods, systems, or mechanisms are disclosed for flexible, exploratory data analysis. For example, a depth d associated with binary expansion can be selected to reflect and explore the complexity of a dependence structure using an example BDD statistical approach described herein. In this example, the BDD statistical approach described herein can be used to examine only certain types of dependence structure to the users' interest. Advantageously, such an approach or algorithm can provide flexibility and is thus usable for various applications, including exploratory data analysis.

In accordance with some aspects of the present subject matter, an example BDD statistical approach or algorithm is outlined as following. First, consider the copula $(U_1, U_2, \ldots, U_p)$, where $U_i = F_{X_i}(X_i)$. Then under the null hypotheses, $(U_1, U_2, \ldots, U_p)$ is uniformly distributed on the p-dimensional unit cube. Otherwise, $(U_1, U_2, \ldots, U_p)$ will appear with a certain pattern, which arises from some dependence structure. To capture this dependence structure, this unit-cube may be partitioned into small equal-sized p-dimensional cubes and these cubes may be labeled as white and grey. Each labeled partition may be referred to as a Binary Interaction Design (BID). Each BID corresponds to a certain type of dependence structure. It is important to note that these BIDs are constructed such that the covariate space is equally divided between white and grey. After constructing these partitions, or BIDs, the challenge of detecting dependence reduces to counting the number of data points which fall in the white cubes and grey cubes respectively. Under the null hypothesis of independence, the number of data points that fall into the white and grey cubes will follow a binomial distribution. Thus, the corresponding probability value (p-value) can be calculated using this information.

Multiple BIDs can be considered to allow the detection of different types of dependence structure. A systematic way is described herein for choosing BIDs to reflect a large family of dependence structure. Eventually, the p-values calculated based on all these BIDs are combined using Bonferroni correction. In many situations the Bonferroni correction is a conservative procedure, overly protective of false positives, but great care is taken in forming the BIDs such that this correction is quite efficient in low dimensions [Zhang (2016)].

Detecting the dependence among variables is an important fundamental problem and is seen in many scientific investigations. An example BDD approach or algorithm described herein enjoys the gains in power and interpretability while substantially improving its speed and scalability relative to other approaches. Therefore, the example BDD approach or algorithm has huge potential in related Big Data problems. A few, non-limiting examples are listed below.

Astronomy, genetic studies, pattern recognition, pairwise screening, randomness testing 1. Astronomy. Astronomical survey produces tons of image on a daily basis. How to automatically detect the pattern of the distribution of celestial objects is a challenging problem due to the size and complexity of patterns [Zhang (2016)]. An example BDD statistical approach described herein can provide a powerful and efficient method for this task.

2. Genetic studies. In a typical gene expression experiments, the primary goal is to identify those genes which are differentially expressed among the treatment and control group. On the other hand, pairs (triples, quadruples, etc.) of genes among these two groups can be studied or analyzed without assuming any models. This much larger family of interactions can provide a thorough understanding of scientific studies. However, the scalability becomes a serious issue and most of the traditional non-parametric methods fail. An example BDD statistical approach described herein can provide a fast and potentially satisfying solution.

3. Pattern recognition. Among a huge number of images, how to differentiate between images which are purely noise and images with structure is a challenging problem especially when there is no prior information about the type of structure. As described in Section 4.2, an example BDD statistical approach described herein, which does not make parametric assumptions, can be used for such a purpose and performs well.

4. Pairwise Screening. Marginal screening has been widely used and studied in the last two decades due to its simplicity and speed in computation [Fan & Lv (2008)]. An example BDD statistical approach described herein can provide alternative statistics for screening based on pairs (triples, quadruples, etc.) of variables.

5. Tests for randomness. Testing randomness and pseudorandom number generators is an important problem in cryptographic applications, such as the generation of key materials. In [Rukhin et al. (2001)], they have listed 16 widely used method in testing binary sequences. Among them, the chi-squared test has been widely used. An example BDD statistical approach described herein can further increase the power to detect pseudorandom ness.

2 An Example BDD Statistical Approach

Let $X_1, X_2, \ldots, X_p$ be p random variables. One aspect of this approach is to test whether all these variables are independent using a null hypothesis and an alternate hypothesis. Namely, the hypotheses tested are:

$H_0$: $X_1, X_2, \ldots, X_p$ are independent versus $H_a$: $X_1, X_2, \ldots, X_p$ are dependent.

Let $(U_1, U_2, \ldots, U_p)$ be the copula where $U_i = F_{X_i}(X_i)$ and $F_{X_i}$ is the marginal cdf function of $X_i$. It is known that marginally $U_i \sim \text{Unif}(0,1)$. Furthermore, $U_i$ are independent under the null hypotheses. Under the alternative hypotheses, these $U_i$s are dependent and the dependence structure can be arbitrary.

On the sample level, assume that $X_{ij}$, i=1, 2, ..., n, j=1,2, ..., p be the data set where n is the sample size. The data set consists of n p-tuples $(X_{i1}, X_{i2}, \ldots, X_{ip})$. Based on the empirical cumulative distribution function, n p-tuples $(U_{i1}, U_{i2}, \ldots, U_{ip})$ are determined where $$U_{ij} = \frac{1}{n}\sum_{k=1}^{n} 1(X_{kj} \leq X_{ij}). \quad (1)$$

For each $U_{ij}$, $wU_{ij}$ can be approximated by a binary expansion up to a given depth, say d. When breaking the unit interval [0,1] by $2^d$ equal sub-intervals, each binary expansion uniquely defines one segment. Consequently, each p-tuple $(U_{i1}, U_{i2}, \ldots, U_{ip})$ corresponds to one p-dimensional cube of width $$\frac{1}{2^d}$$

(referred to as a p-a-cube hereafter) in the p-dimensional unit cube. Note that there are $2^{dp}$ p-d-cubes in total. When scanning through all the p-tuples, the number of tuples that falls in each p-d-cube can be counted.

Next, these p-d-cubes can be grouped according to BIDs. Each BID can be viewed as coloring half p-d-cubes as white and half of the cubes as grey. Under the null hypotheses, the number of p-tuples falling in the white cubes follows a binomial distribution with the probability p=0.5. The null hypothesis can be rejected if such a number is significantly different from a half of the sample size. Or equivalently, the null hypothesis can be rejected when the corresponding p-value based on the binomial distribution is sufficiently small. Such a BID carries the information of how these variables are dependent.

When facing with a non-parametric assumption on the dependence, using one single BID is powerful for one scenario but powerless in others. Consequently, multiple BIDs may be constructed carefully to reflect as many dependence structures as possible. One can then apply various multiplicity adjustment to these $(2^d-1)^p$ p-values to get the final p-value. For instance, the Bonferroni correction can be used to obtained the final p-value.

In some embodiments, an example dependence-detection statistic can be calculated according to the following steps:

1. For any p-tuple $(U_{i1}, U_{i2}, \ldots, U_{ip})$, identify the corresponding p-d-cube in the p-dimensional unit cube;
2. For a given depth d, construct $(2d-1)^p$ BIDs;
3. Scan through all the data and obtain the count in the white and grey regions for each BID. Calculate the resultant p-value for each BID.
4. Adjust the multiplicity using, for instance Bonferroni correction, to these $(2^d-1)^p$ p-values and obtain the final p-value.

In the next section, additional details regarding using bitwise operation is provided.

2.1 Step 1: Locate p-d-Cubes

For $U_{ij}$, let $c_{ij} = \lceil U_{ij} \times 2^d \rceil$ where $\lceil x \rceil$ is the ceiling function and returns the smallest integer which is greater than or equal to x. Then for the p-tuple $(U_{i1}, U_{i2}, \ldots, U_{ip})$, the corresponding p-d-cube is located at the position $(c_{i1}, c_{i2}, \ldots, C_{ip})$.

2.2 Step 2: Construct BIDs

First, construct $2^d-1$ configuration for one dimension. Each configuration is a way of coloring the $2^d$ subintervals of [0,1] with an equal length of $$\frac{1}{2^d}.$$

This can De represented by a sequence of $2^d$ digits consisting of either 0 or 1. These $2^d-1$ configurations are generated from d basic configurations, denoted as $A_1, A_2, \ldots, A_d$. Here $$A_1 = (\underbrace{0\ldots0}_{2^{d-1}} \; \underbrace{1\ldots1}_{2^{d-1}}).$$

For i≥2, $A_i$ is defined recursively as $A_i = \text{NOT}(A_{i-1} \text{XOR} << (1<<(d-i))))$.

Here, the bitwise XOR takes two bit patterns of equal length and performs the logical exclusive OR operation on each pair of bits; the notation "A<<n" means to left-shift A by n bits; the bitwise NOT performs logical negation on each bit.

FIG. 1 depicts example one-dimensional configurations for a BID generated using bitwise operations. For example, when d=3, $A_1$=(00001111), $A_2$=(00110011), $A_3$=(01010101).

In FIG. 1, $A_1, \ldots, A_2$ and $A_3$ is depicted when the depth is 3.

Once $A_1, \ldots, A_d$ is determined, all possible subsets $A_{i_1}, \ldots, A_{i_k}$ can be selected and $A_{i_1} \odot A_{i_2} \ldots \odot A_{i_k}$ can be calculated where $A_i \odot A_j$ is defined as $$A_i \odot A_j = \text{NOT}(A_i \text{XOR} A_j).$$

For instance, $$A_4 = A_1 \odot A_2 = (11000011)$$

which is also graphically depicted in FIG. 1. It is easy to check that the operator, $\odot$, exhibits the commutative property and associative property. For any given depth d, the total number of configurations is $2^d - 1$.

After getting these configurations $A_i$'s, $i=1,2,\ldots, 2^d-1$, BIDs can be constructed which are labeled according to p subscripts as $$\text{BID}=A_{i_1, i_2, \ldots, i_p} = A_{i_1} \circledB A_{i_2} \circledB \ldots \circledB A_{i_p},$$

where $i_j=1,2,\ldots, 2^d-1$, and $j=1,2,\ldots, p$. Here, the BDD product $\circledB$ is defined as following.

Let BID be any color scheme of $(k-1)$-d-cubes in a $(k-1)$-dimensional unit cube and A be a configuration. Then the BDD product BID$\circledB$A defines a color scheme of $2^{kd}$ k-d-cubes in a k-dimensional unit cube. For each k-d-cube, project it to BID and the configuration A. If the colors from these two projections agree, set the color of this k-d-cube as grey; otherwise white.

Figure 2:
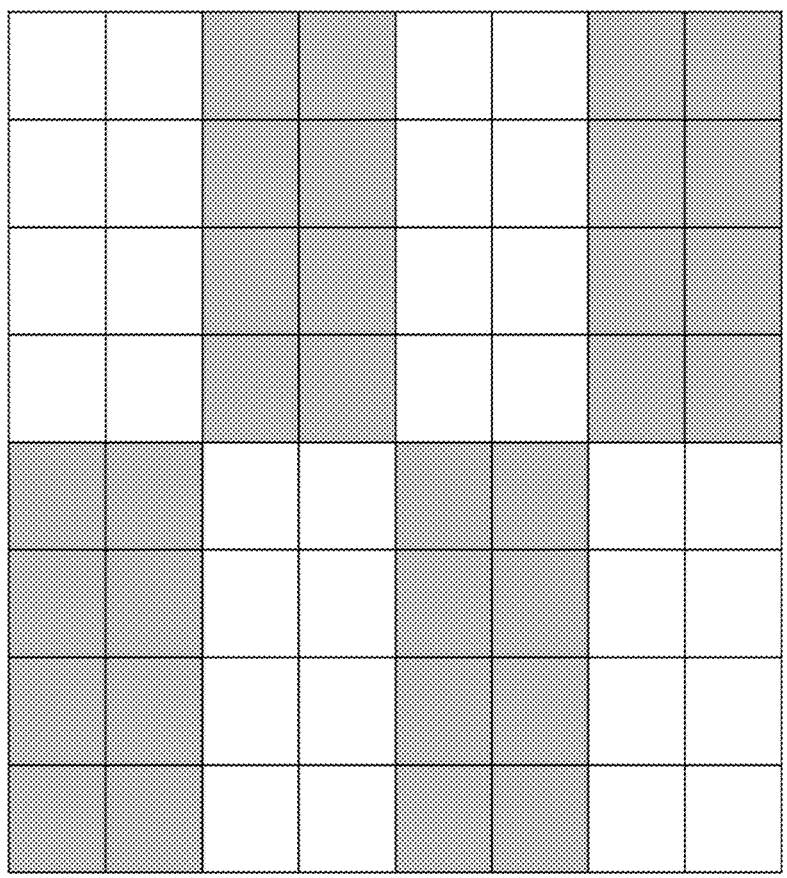
FIG. 2 depicts an example binary interaction design depicting a pattern structure.

FIG. 2 depicts an example binary interaction design depicting a pattern structure. As an example, $$A_1 \circledB A_2 = \begin{pmatrix} 1 & 1 & 1 & 1 & 0 & 0 & 0 & 0 \\ 1 & 1 & 1 & 1 & 0 & 0 & 0 & 0 \\ 0 & 0 & 0 & 0 & 1 & 1 & 1 & 1 \\ 0 & 0 & 0 & 0 & 1 & 1 & 1 & 1 \\ 1 & 1 & 1 & 1 & 0 & 0 & 0 & 0 \\ 1 & 1 & 1 & 1 & 0 & 0 & 0 & 0 \\ 0 & 0 & 0 & 0 & 1 & 1 & 1 & 1 \\ 0 & 0 & 0 & 0 & 1 & 1 & 1 & 1 \end{pmatrix},$$

is graphically depicted in FIG. 2, where the 1s represent the color grey and the 0s represent the color white.

Figure 3:
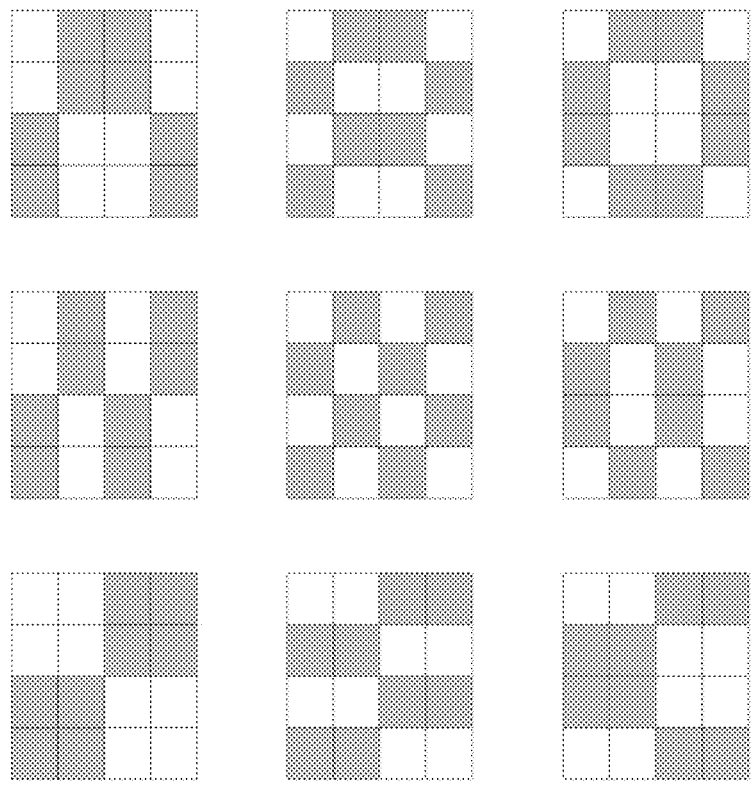
FIG. 3 depicts nine example binary interaction designs depicting different pattern structures.

FIG. 3 depicts nine BIDs corresponding to nine different dependence patterns. In FIG. 3, a scenario is depicted where p=2 and the depth is 2. For instance, the top-left pattern corresponding to the linear dependence; top-middle one corresponds to zig-zag dependence; the one in the center corresponds to the chess-board type dependence; the bottom-right one corresponds to the circular dependence. When the variables are dependent according to the center BID, then the "cluster intuition" is clearly wrong and any methods based on such intuition fails.

2.3 Step 3: Calculate BDD Statistics

For any given $\text{BID}_{i_1, \ldots, i_p}$, let $x_{i_1, \ldots, i_p}$ be the number of p-tuples of which the corresponding p-d-cube are grey. A related theorem, Theorem 2.1, is presented below.

Theorem 2.1

Under the null hypotheses, $x_{i_1, \ldots, i_p} \sim \text{Binomial}(n, 0.5)$.

Proof of Theorem 2.1.

Note that under the null hypotheses, $$U_i \overset{iid}{\sim} \text{Unif}(0, 1).$$

It suffices to show that the total number of ones in this BID is the same as the total number of zeros; or equivalently, the total number of grey p-d-cubes is the same as the total number of white p-d-cubes. The starting case when p=1 is based on the following Lemma.

Lemma 2.1

Let $A_i$ be any configuration with a depth of d, then $$\sum_{l=1}^{2^d} A_i^{l,d} = 2^{d-1}$$

where $A_i^{l,d}$ is the l-th entry in the i-th configuration with the depth of d.

According to Lemma 2.1, Theorem 2.1 holds for p=1. Assume that the theorem holds for the dimension of p−1 ($p \geq 2$). Let $$\text{BID}_{i_1 i_2 \ldots i_p} = A_{i_1} \circledB A_{i_2} \ldots \circledB A_{i_p}$$

be a BID under the dimension of p. View all these $2^{dp}$ p-d-cubes as $2^d$ slices arranged according to $A_{i_1}$ where each slice consists of $2^{(p-1)d}$ p-d-cubes. For the j-th slice, the color of these cubes remains the same as the (p−1)-d-cubes $A_{i_2} \circledB \ldots \circledB A_{i_p}$ if $A_{i_1}^j = 1$; otherwise, the color for these cubes are switched. Note that the total number of grey (p−1)-d-cubes in $A_{i_2} \circledB \ldots \circledB A_{i_p}$ is the same as the total number of white ones. Therefore, the total number of grey p-d-cubes in $\text{BID}_{i_1 i_2 \ldots i_p}$ is also the same as the total number of white ones. This completes the proof of Theorem 2.1 based on the mathematical induction.

Proof of Lemma 2.1.

Mathematical induction is used to prove Theorem 2.1. When the depth, d, is 2, there are three configurations, $$A_1^2 = (0011), A_2^2 = (0101), A_3^2 = (1001).$$

Obviously, Lemma 2.1 holds for d=2. Here, the notation 4 can be used to denote the k-th configuration with the depth of d.

Assume that this lemma holds for the depth of d−1 ($d \geq 3$). Note that all the configurations of the depth d are generated from $$A_1^d, A_2^d, \ldots, A_d^d,$$

where $$A_1^d = (\underbrace{0\ldots 0}_{2^{d-1}} \; \underbrace{1\ldots 1}_{2^{d-1}})$$

and $$A_i^d = (A_{i-1}^{d-1}, A_{i-1}^{d-1})(i \geq 2).$$

Then the total number of ones in any basic configuration is the same as the number of zeros.

For any other configuration, say A, it can be written as $$A = A_{i_1}^d \odot \ldots \odot A_{i_k}^d,$$

where $k \leq d$.

(i). If $1 \notin \{i_1, i_2, \ldots, i_k\}$, then each element $A_{i_j}^d$ can be written as $(A_{i_j-1}^{d-1}, A_{i_j-1}^{d-1})$. The above configuration can be written as $$(A_{i_1-1}^{d-1} \odot \ldots \odot A_{i_k-1}^{d-1} \odot \ldots \odot A_{i_1-1}^{d-1} \odot \ldots \odot A_{i_k-1}^{d-1}).$$

Note that the number of ones in $A_{i_1-1}^{d-1} \odot \ldots \odot A_{i_k-1}^{d-1}$) is the same as the number of zeros. Therefore, the same conclusion holds for the configuration A.

(ii). If $1 \in \{i_1, i_2, \ldots, i_k\}$, note that the operator $\odot$ has the commutative property. Without loss of generality, assume that $i_1=1$. Then $$A_{i_2}^d \odot \ldots \odot A_{i_k}^d = (A_{i_2-1}^{d-1} \odot \ldots \odot A_{i_k-1}^{d-1},$$
$$A_{i_2-1}^{d-1} \odot \ldots \odot A_{i_k-1}^{d-1}).$$

When putting $A_1^d$ at the beginning, it flips zeros and ones of the first half part and keeps all the bits of the second part. Note that for each part, the total number of zeros and ones are the same. Such an operation will double the amount of zeros and ones and the total number of zeros and ones are still the same. This completes the proof.

According to Theorem 2.1, the p-value can be calculated based on $BID_{i_1, \ldots, i_p}$ as $$p_{i_1,\ldots,i_p} = 2 * P(\text{Bin}(n, 0.5) > \max(x_{i_1}, \ldots, i_p)).$$

2.4 Step 4: Adjust for Multiplicity

Note that the total number of BIDs is $(2^d-1)^p$. Therefore, the multiplicity can be adjusted using the Bonferroni correction. Namely, the final p-value for testing the hypotheses $H_0$ is $$p\text{-value} = (2^d-1)_p * \min_{i_1, \ldots, i_p}(p_{i_1, i_2, \ldots, i_p})$$

Or equivalently, the final BDD statistic is defined as $$\text{BEStat} = \max_{i_1, \ldots, i_p}(x_{i_1, \ldots, i_p}, n - x_{i_1, \ldots, i_p}).$$

and the p-value can be rewritten as $$p\text{-value} = 2 * (2^d-1)^p * P(\text{Binomial}(n, 0.5) > \text{BEStat}).$$

3 Computational Efficiency Comparison

The major expense of the computation is to calculate the empirical cdf function. Consider $X_{kj}$, $k=1, 2, \ldots, n$, the sample for the j-th variable. Let $X_{(k)j}$ be the corresponding ordered sequence increasingly. Then $$U_{(k)j} = \frac{k}{n}.$$

Consequently, the computation time of an example BDD statistical approach described herein is determined by the sorting step and the time complexity of such an approach is $O(n \log n)$. Additionally, this approach defined in Section 2 uses bitwise operations. As a result, the approach is remarkably fast. It is thus of interest to see how this approach (e.g., algorithm) and existing methods perform when the sample sizes increase.

The methods under consideration are the Pearson Correlation, an example BDD statistical approach and Distance Correlation (DC) (n<10,000). When sample size is greater than 10,000, DC consumes a lot of memory and cannot be finished. The computation is done on a desktop with Intel i5-3330 CPU @ 3.00 GHz and 8 Gigabytes of memory. The sample size various between 1 thousand to 10,000 thousand (10 million).

Figure 4:
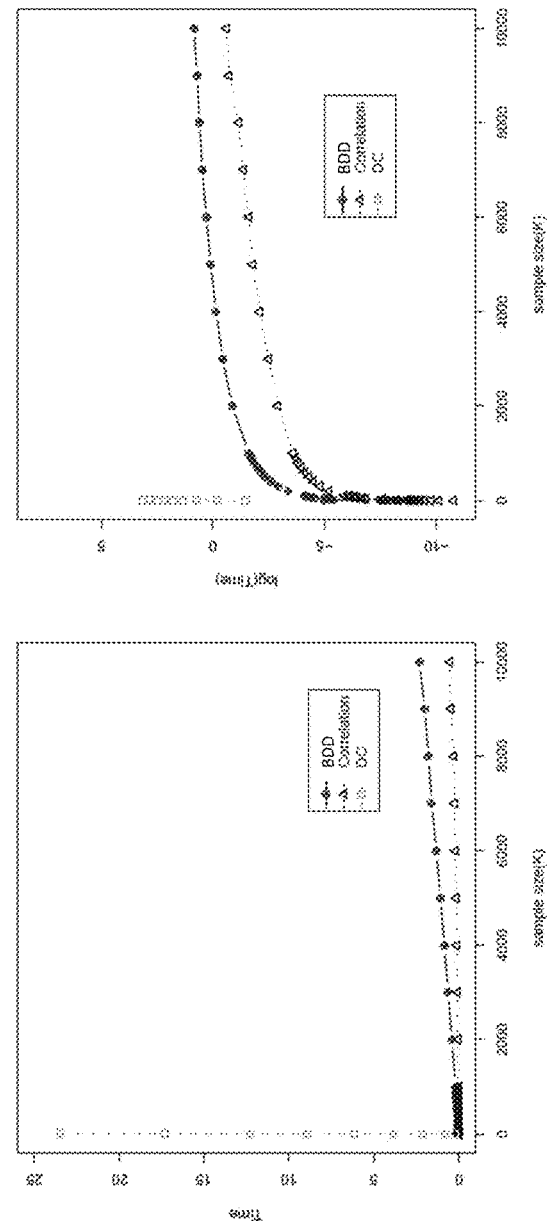
FIG. 4 depicts two graphs indicating computation times of multiple methods for detecting dependence between variables.
Figure 5:
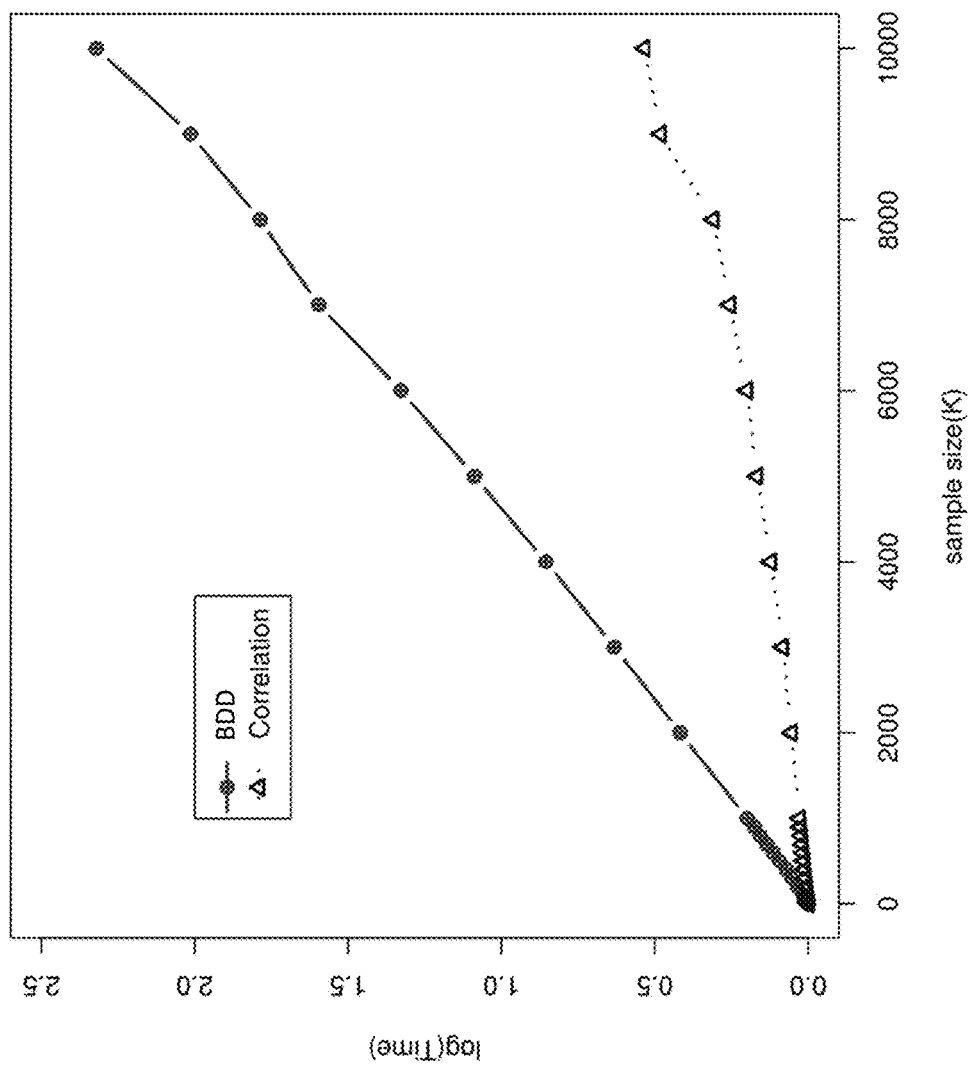
FIG. 5 depicts a graph indicating computation times of a correlation method and an example bitwise-based dependence-detection (BDD) statistical approach described herein.

FIG. 4 depicts two graphs indicating computation times of multiple methods for detecting dependence between variables. In the left panel of FIG. 4, the computation time against the sample size is plotted and, in the right panel, the logarithm of time against the sample size is plotted. FIG. 5 depicts another graph indicating the logarithm of time against the sample size for a Pearson correlation method and an example BDD statistical approach described herein. As depicted in FIG. 4, the Pearson correlation is the fastest one because it ignores all other forms of dependence except linear dependence. When the sample size is 10 million, it only takes 0.53 second to calculate the Pearson correlation. For BDD statistics, it takes only 2.32 seconds which is only 5 times longer time than Pearson correlation.

The example BDD statistical approach is also much more efficient than the DC. For instance, when n=1,000, it takes 0.00012 and 0.233 seconds for BDD and DC respectively to calculate the test statistic. BDD is 1900+ times faster than DC. When n=9,000, the computing time for both methods are 0.0006 and 23.47 seconds respectively. BDD is 39,000+ times faster than DC.

4 Numerical Comparison 4.1 Nonlinear-Dependence Detection

In this section, an example BDD statistical approach described herein is shown to have good statistical power to detect various dependence structures, including a linear association, a circular relation, and many others. The sample size is n=1,000.

Figure 6:
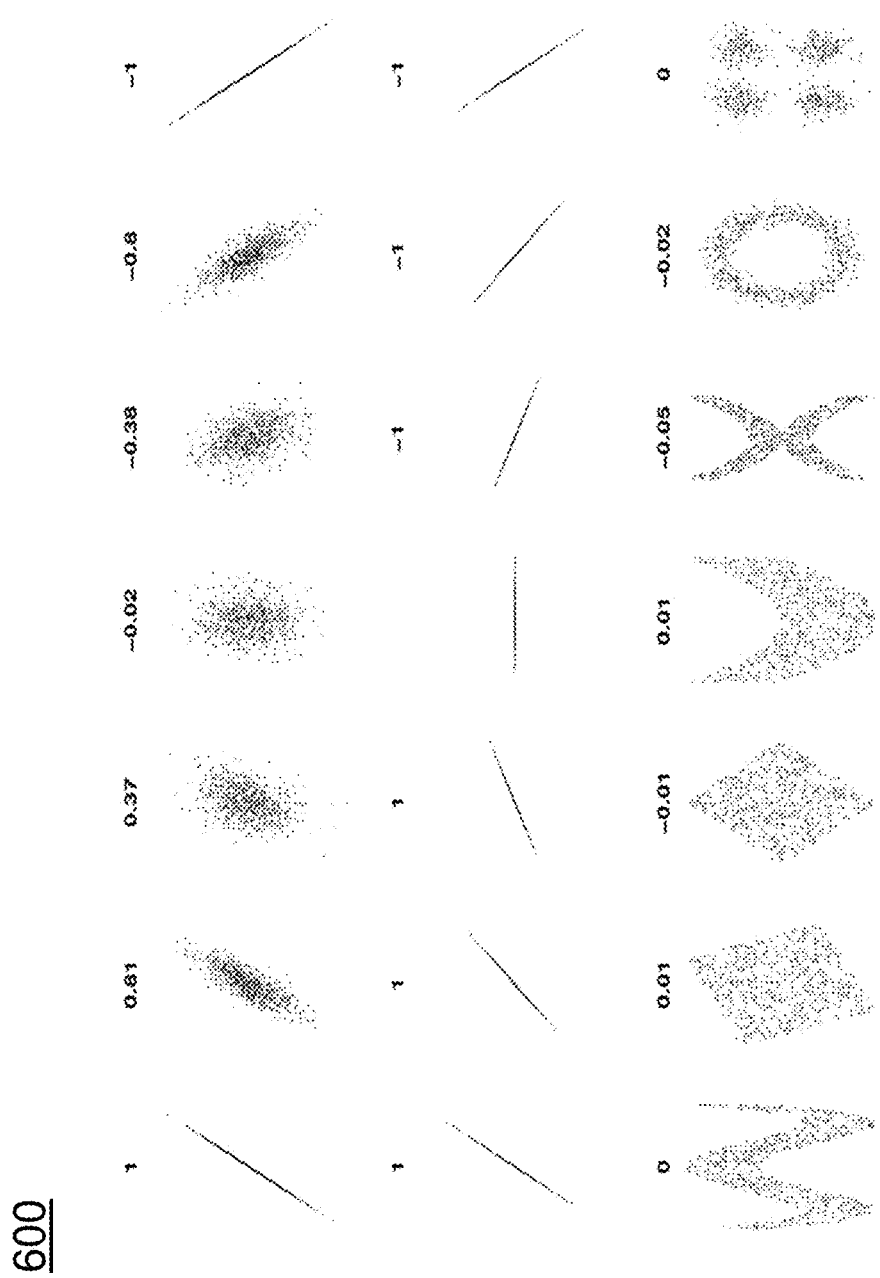
FIG. 6 depicts multiple data plots indicating various dependence structures and corresponding correlation coefficients.

FIG. 6 depicts multiple data plots indicating various dependence structures and corresponding correlation coefficients. In FIG. 6, the correlation coefficients are calculated for various dependence structures provided from the page https://en.wikipedia.org/wiki/Correlation_and_dependence. As expected, it can detect the linear association well. However, as shown in the last row, it fails to detect many non-linear associations.

Figure 7:
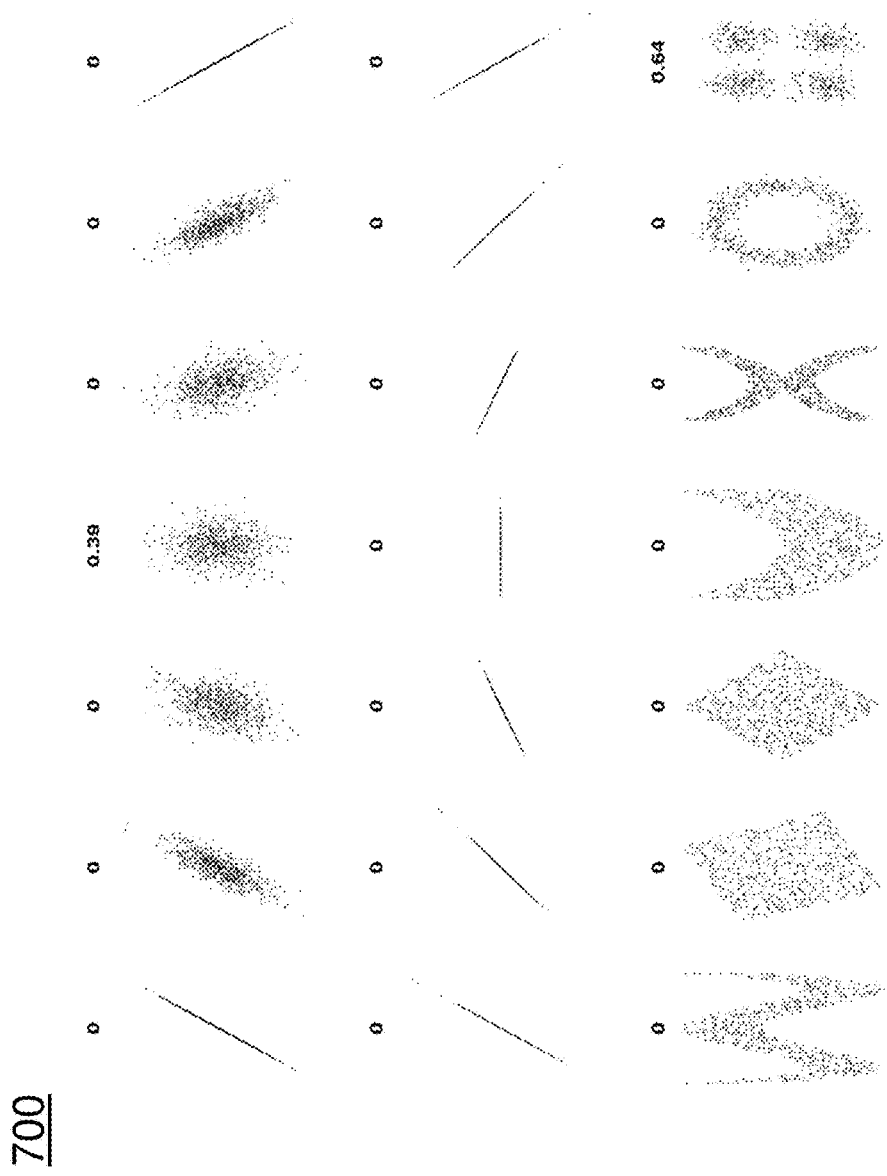
FIG. 7 depicts multiple data plots indicating various dependence structures and corresponding probability values (p-values) based on an example BDD statistical approach described herein.

FIG. 7 depicts multiple data plots indicating various dependence structures and corresponding p-values based on an example BDD statistical approach described herein. In FIG. 7, the BDD statistics and the corresponding p-value are calculated for each simulated data set using an example BDD statistical approach described herein. The smaller the p-value is, the stronger the dependence is. As depicted, the example BDD statistical approach works nicely in detecting the existence of both linear and non-linear relationships. The null hypothesis for the fourth case in the first row is not rejected when these two variables are sampled independently from normal distributions. The null hypothesis for the last one is also not rejected where two variables are globally independent. Both decisions are correct.

The power function of the Pearson correlation, the example BDD statistical approach, chi-squared test, and distance correlation [Székely et al. (2007)], abbreviated as DC, can be calculated with respect to the sample size. For the chi-squared test, after taking the copula transformation, the unit square can be divided as $1/K^2 (K=2,3,4,5)$ equal-sized squares and the corresponding p-values can be calculated. The Bonferroni's adjustment can then be used to get the final p-value. The X-shape (the third one from the last in FIG. 7) and the circular shape (the second one from the last in FIG. 7) are considered in FIGS. 8 and 9, respectively. For a simulated data set, the null hypotheses are rejected if the p-values (of BDD and DC) is less than or equal to 0.05 or the Pearson correlation is greater than 0.5.

Figure 8:
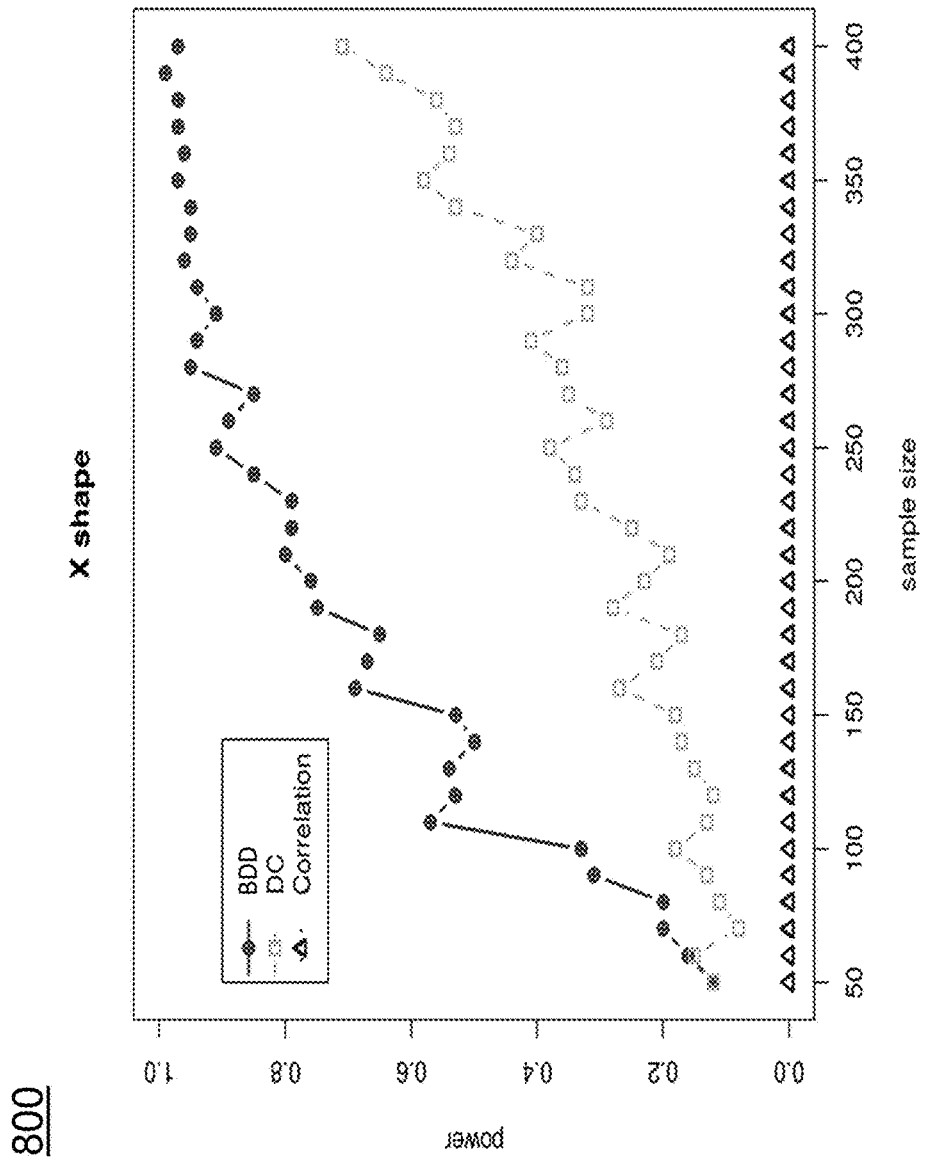
FIG. 8 depicts a graph indicating statistical power against sample size for an 'X' shape data plot.
Figure 9:
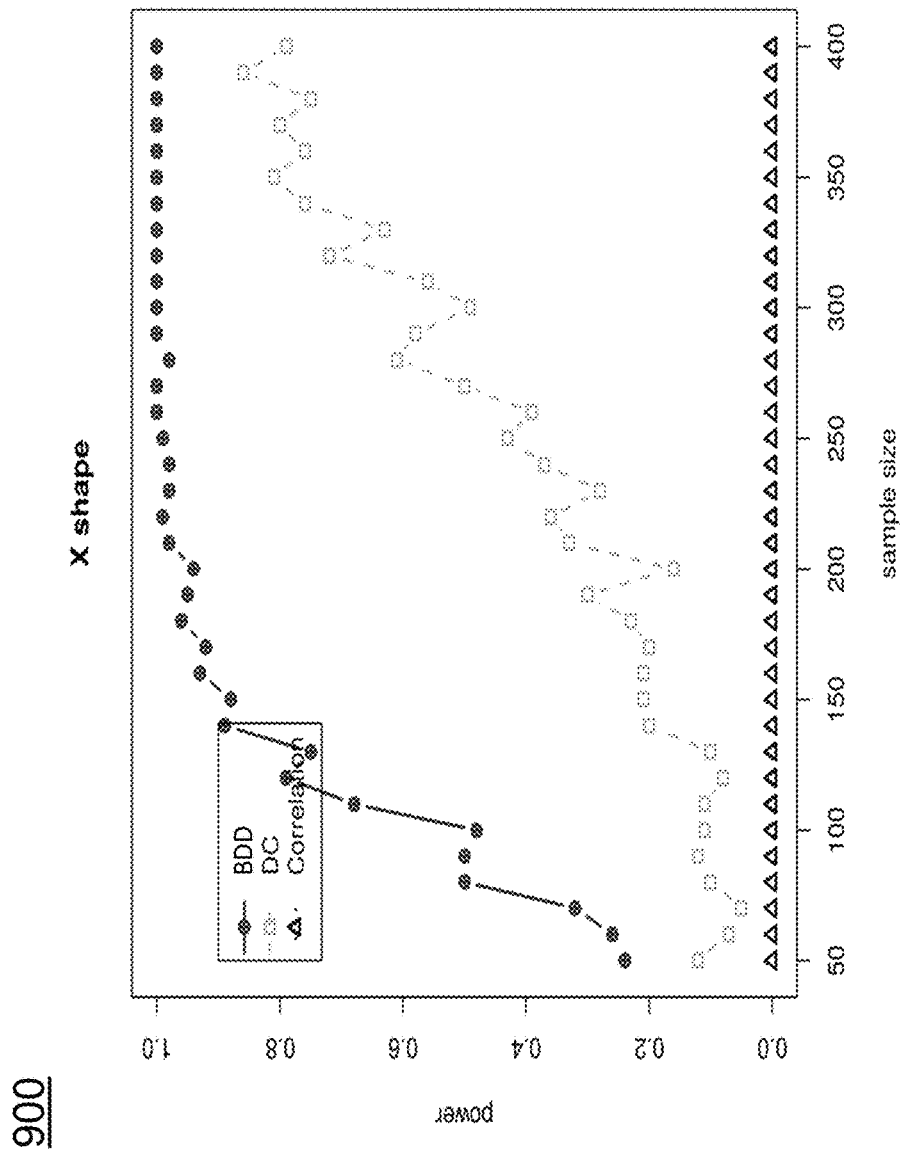
FIG. 9 depicts a graph indicating statistical power against sample size for a circle shape data plot.

FIG. 8 depicts a graph indicating statistical power against sample size for an 'X' shape data plot. FIG. 9 depicts a graph indicating statistical power against sample size for a circle shape data plot. In FIGS. 8 and 9, the simulated power based on 100 replications against the sample size, which varies from 50 to 400, is depicted. As shown, the example BDD statistical approach is more powerful in detecting the structure than DC, chi-squared test, and Pearson correlation.

4.2 Handwritten Digits Detection

In this application, an example BDD statistical approach described herein is usable to detect the existence of handwritten digits. The MNIST data set, a simple computer vision dataset can be considered for this application. It consists of images of handwritten digits with the size of 28×28. In the original dataset, there are 55,000 digits in the training set, and 10,000 digits in the testing set. The original goal of the study is to classify the digits with high accuracy. As used with regard to the subject matter described herein, the design is modified such that if a handwritten digit exists in a picture, the coordinates of a black pixel should be dependent. The dependence structure associated with a handwritten digit can be quite arbitrary because it depends on both the digit and the way to write it. Various methods can be tested to see if they are able to identify these handwritten digits.

In comparison, the methods considered are based on the Pearson correlation, DC, Chi-squared test, and the example BDD statistical approach described above. In each simulation, $p*\pi_1$ images are randomly chosen from the training set and $p*(1-\pi_1)$ images are randomly generated by randomly assigning 175 black pixels in the 28×28 images. Here, 175 is chosen to approximate the number of black pixels in all the images in the training set. Various statistical methods are used to find as many handwritten digits as possible, subject to the control of false discovery rate [Benjamini & Hochberg (1995)]. As indicated above, this problem can be formulated as testing multiple hypotheses:

$H_{0i}$: $x_i$ and $y_i$ are independent, versus $H_{1i}$: $x_i$ and $y_i$ are dependent, where $x_i$ and $y_i$ are the coordinates on the x-axis and y-axis of all the pixels in the i-th image.

Various methods can be applied to these p images and p-values can be calculated. The BH method [Benjamini & Hochberg (1995)], adjusting for the multiplicity, is then applied to find the rejections. For each simulation, the number of false rejections and the total number of rejections can be counted for each methods to obtain the ratio of these two quantities, known as the false discovery proportion. This step is repeated 100 times to get a simulate false discovery rate (FDR). An example nominal level to achieve at controlling is $\alpha=0.05$.

When p=10,000, the simulated FDR of these three methods when $\pi_1$ vary among 0.7, 0.8, 0.9, and 0.95 may be summarized. Using p-values based on the example BDD statistical approach, Chi-squared test or Pearson correlation, the false discovery rate is deemed controlled well at the designated level, 0.05. On the other hand, the FDR based on the p-values from DC inflates to an extent that raises serious concerns. The average number of true positives and false positives is summarized in Table 2. The winner in this comparison is the chi-squared test because the chi-squared test results in the largest number of true positives and the smallest number of false positives. Using DC can find a slightly larger number of true positives than the example BDD statistical approach with the price of committing an unacceptable number of false positives. For instance, when $\pi_1=0.05$, DC can find 53 more handwritten figures, with the price of committing 227 more false positives on average.

TABLE 1

Simulated FOR for three methods under different parameter settings.

| Method | $\pi_1 = 0.3$ | $\pi_1 = 0.2$ | $\pi_1 = 0.1$ | $\pi_1 = 0.5$ |
|---|---|---|---|---|
| BDD | 0.023 | 0.036 | 0.026 | 0.032 |
| DC | 0.094 | 0.136 | 0.229 | 0.353 |
| Correlation | 0.035 | 0.041 | 0.046 | 0.05 |
| Chi-squared | 0.004 | 0.004 | 0.004 | 0.004 |

TABLE 2

Simulated FOR for three methods under different parameter settings.

| Method | $\pi_1 = 0.3$ | $\pi_1 = 0.2$ | $\pi_1 = 0.1$ | $\pi_1 = 0.5$ |
|---|---|---|---|---|
| BDD | 2734/66 | 1774/66 | 841/23 | 393/13 |
| DC | 2767/290 | 1829/288 | 904/268 | 448/244 |
| Correlation | 1834/68 | 1183/51 | 559/27 | 265/14 |
| Chi-squared | 2774/10 | 1814/7 | 881/3.36 | 424/1.5 |

Figure 10:
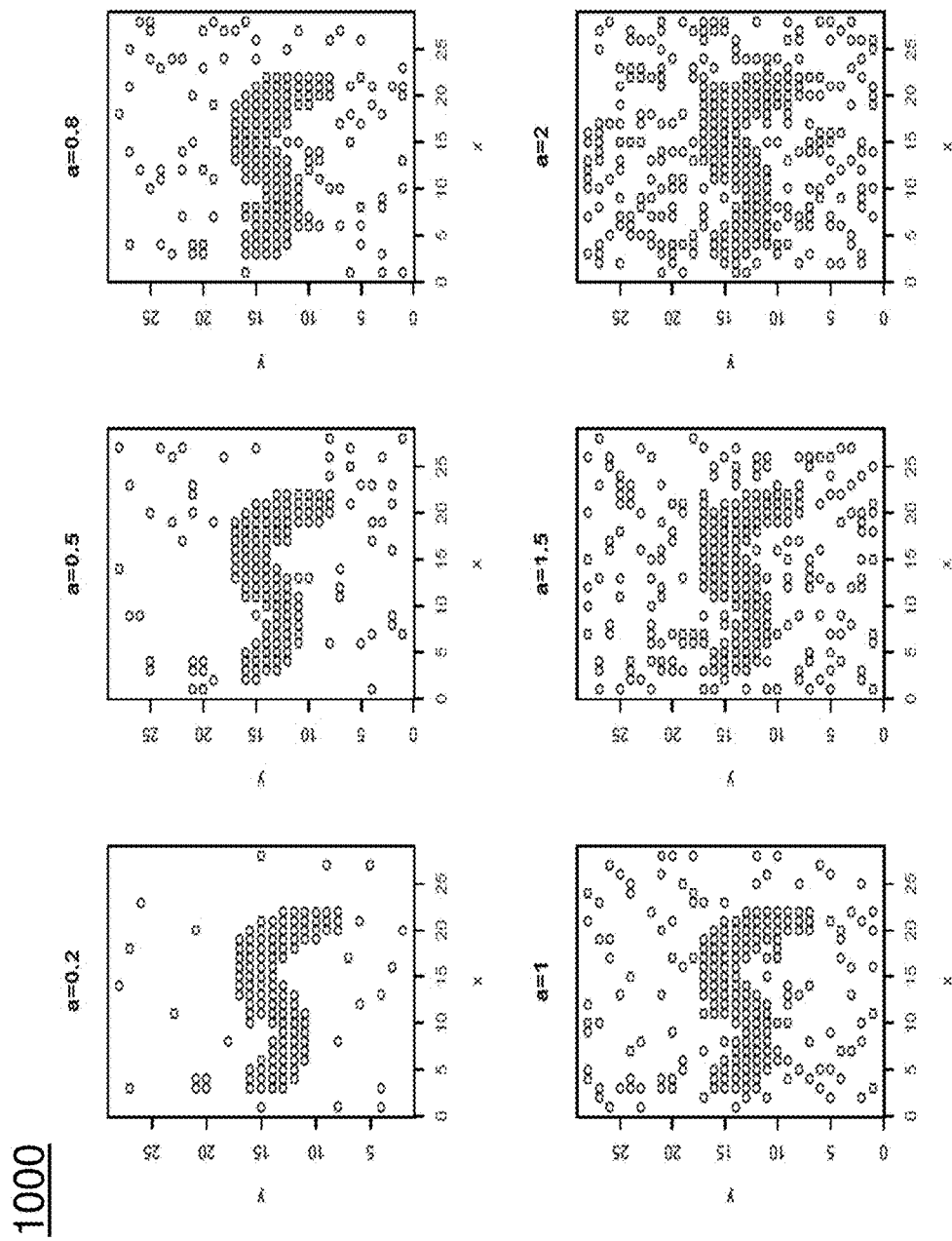
FIG. 10 depicts multiple data plots representing images contaminated with random noise.

FIG. 10 depicts multiple data plots representing images contaminated with random noise. For example, in the second experiment, the power of various methods is tested when the image is contaminated with random noises. An image is randomly selected which consists of n black pixels. Then p*n black pixels are randomly placed in this image where p is among 0.2, 0.5, 0.8, 1, 1.5, and 2 respectively. In FIG. 10, these contaminated images are plotted. As shown in FIG. 10, the pattern becomes murkier when p increases. The p-values are then calculated based on the example BDD statistical approach, DC, Chi-squared test, and Pearson correlation. The null hypothesis is rejected if the corresponding p-value is less than or equal to 0.05. This step is repeated 100 times to calculate the power based on the various methods and is summarized in Table 3. The example BDD statistical approach substantially improves its competitors. For the worst case when p=2, the power of the example BDD statistical approach is 0.47. On the contrary, all its competitors fail.

In both experiments, the example BDD statistical approach works much better than the distance correlation and the correlation. The Chi-squared test works better when the handwritten digits is clean; however, when the images are contaminated with random noises, the example BDD statistical approach is much better than the Chi-squared test.

TABLE 3

Power comparison for contaminated images.

| p | 0.2 | 0.5 | 0.8 | 1 | 1.5 | 2 |
|---|---|---|---|---|---|---|
| BDD | 1.00 | 0.96 | 0.84 | 0.80 | 0.67 | 0.47 |
| DC | 0.87 | 0.36 | 0.18 | 0.16 | 0.11 | 0.07 |
| Correlation | 0.38 | 0.13 | 0.09 | 0.09 | 0.05 | 0.04 |
| Chi-squared Test | 0.87 | 0.45 | 0.20 | 0.23 | 0.10 | 0.01 |

5 Additional Thoughts

Testing the dependence between multiple variables is a long known, yet challenging problem, attracting the attention of statisticians for more than one hundred years. Corresponding to the rapid increase in the complexity of datasets, there has been a rapid increase in attempts to construct distribution-free methods of detecting dependence between variables. Interestingly, most of those existing methods have relied on the "cluster intuition" when forming their statistics, missing global dependence patterns. Another issue faced in these settings is slow computation, an obstacle that prevents many methods, such as DC, from being useful in the analysis of big data. In the subject matter described herein, example BDD statistical approaches are disclosed to test the dependence of multiple variables. Such a framework can be used to discover both global and local patterns and can scale to extremely large samples. As such, an example BDD statistical approach can be usable in exploratory data analysis.

An example BDD statistical approach described herein can be extended to handle various situations arising from scientific investigations. For example, an example BDD statistical approach can be modified or extended in the following directions: (i) supervised version, allowing the group labeling information to calculate the statistics; (ii) allowing different depths along different dimension when the heterogeneity exists along different directions (intuition: subgroups have different data generating functions); (iii) currently, the p-values from each BID is combined using the Bonferroni correction. Because the BIDs are constructed in a way that these p-values are pair-wise independent, other forms of multiplicity adjustment may be utilized to further boost the statistical power of an example BDD statistical approach.

In some embodiments, an example BDD statistical approach described herein or a variant thereof may utilize continuous variables. In some embodiments, an example BDD statistical approach described herein or a variant thereof may utilize non-continuous variables.

Reference will now be made in detail to various embodiments of the subject matter described herein, examples of which are illustrated in the accompanying drawings. Wherever possible, the same reference numbers will be used throughout the drawings to refer to the same or like parts.

Figure 11:
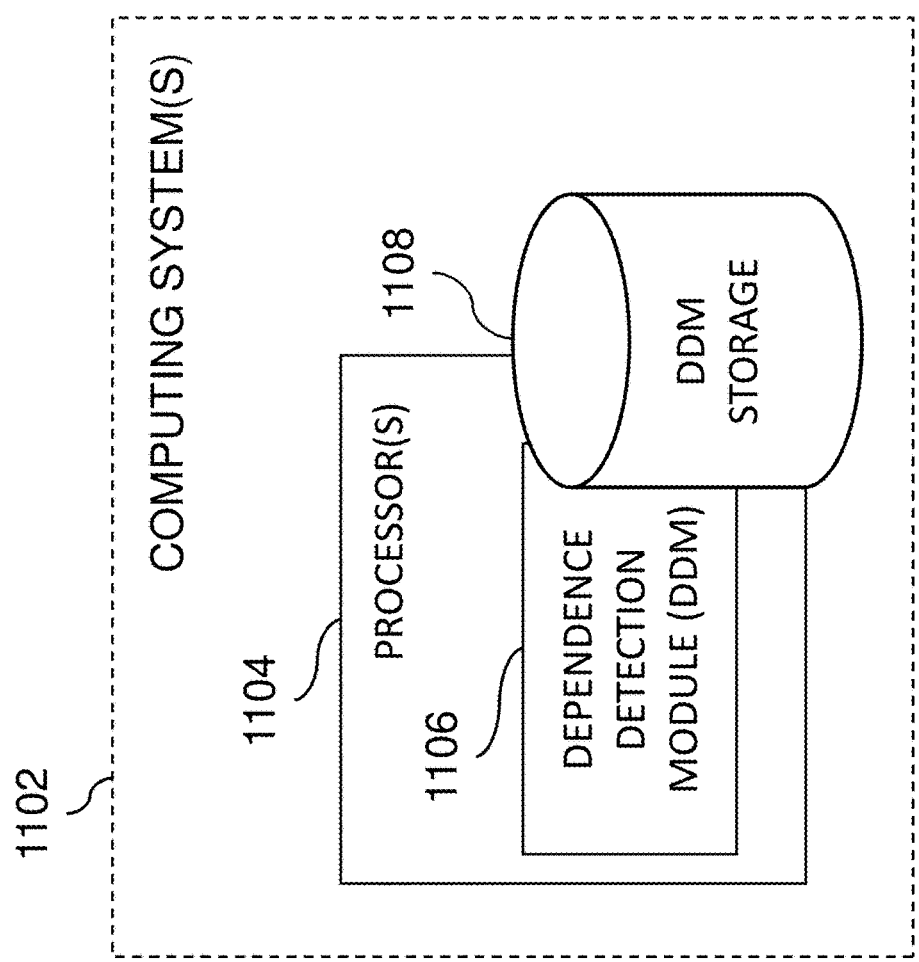
FIG. 11 is a diagram illustrating an example system for non-parametric dependence detection using bitwise operations in a computing system.

FIG. 11 is a diagram illustrating an example system 1102 (e.g., a single or multiple processing core computing device or a distributed computing system) for non-parametric dependence detection using bitwise operations. System 1102 may be any suitable entity, e.g., a blade server, a mobile computing device, or one or more computing devices or platforms, for performing one or more aspects associated with detecting non-parametric dependence between multiple variables using bitwise operations.

In some embodiments, components, modules, and/or portions of system 1102 may be implemented or distributed across multiple devices or computing platforms. For example, system 1102 may involve multiple computers configured to perform various functions, such as binary expansion using bitwise operations, creating configurations, generating BIDs, plotting/projecting values amongst the BIDs, determining a final p-value based on the BIDs, and/or additional data analysis.

In some embodiments, system 1102 may include one or more processor(s) 1104, a dependence detection module (DDM) 1106, and a DDM storage 1108. Processor(s) 1104 may represent or include a physical processor, a general-purpose microprocessor, a single-core processor, a multi-core processor, a field-programmable gate array (FPGA), and/or an application-specific integrated circuit (ASIC). In some embodiments, processor(s) 1104 may be configured to execute software stored in one or more non-transitory computer readable media, such as DDM storage 1108 in system 1102. For example, software may be loaded into a memory structure for execution by processor(s) 1104. In some embodiments, e.g., where system 1102 includes multiple processors, some processor(s) 1104 may be configured to operate independently of other processor(s) 1104.

DDM 1106 may be any suitable entity or entities (e.g., software executing on processor(s) 1104, an ASIC, an FPGA, or a combination of software, an ASIC, or an FPGA) for performing one or more aspects associated with detecting non-parametric dependence between multiple variables using bitwise operations. In some embodiments, DDM 1106 may be implemented using processor(s) 1104 and/or one or more memories, such as DDM storage 1108. For example, DDM 1106 may utilize processor(s) 1104 (e.g., using software stored in local memory) and random-access memory (RAM).

DDM storage 1108 may be any suitable entity or entities (e.g., one or more memory devices) for storing information associated with detecting non-parametric dependence between multiple variables using bitwise operations. For example, DDM storage 1108 may store one or more BDD algorithms or variants, binary expansion rules, configurations, BIDs, dependence structures selection logic, p-values, data for analysis (e.g., variables), and/or analysis related information. In another example, DDM storage 1108 may store information about various applications, e.g., astronomy charts, genetic sequencing maps, common or example pattern structures, pairwise screening, and/or random seeds.

It will be appreciated that FIG. 11 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 12:
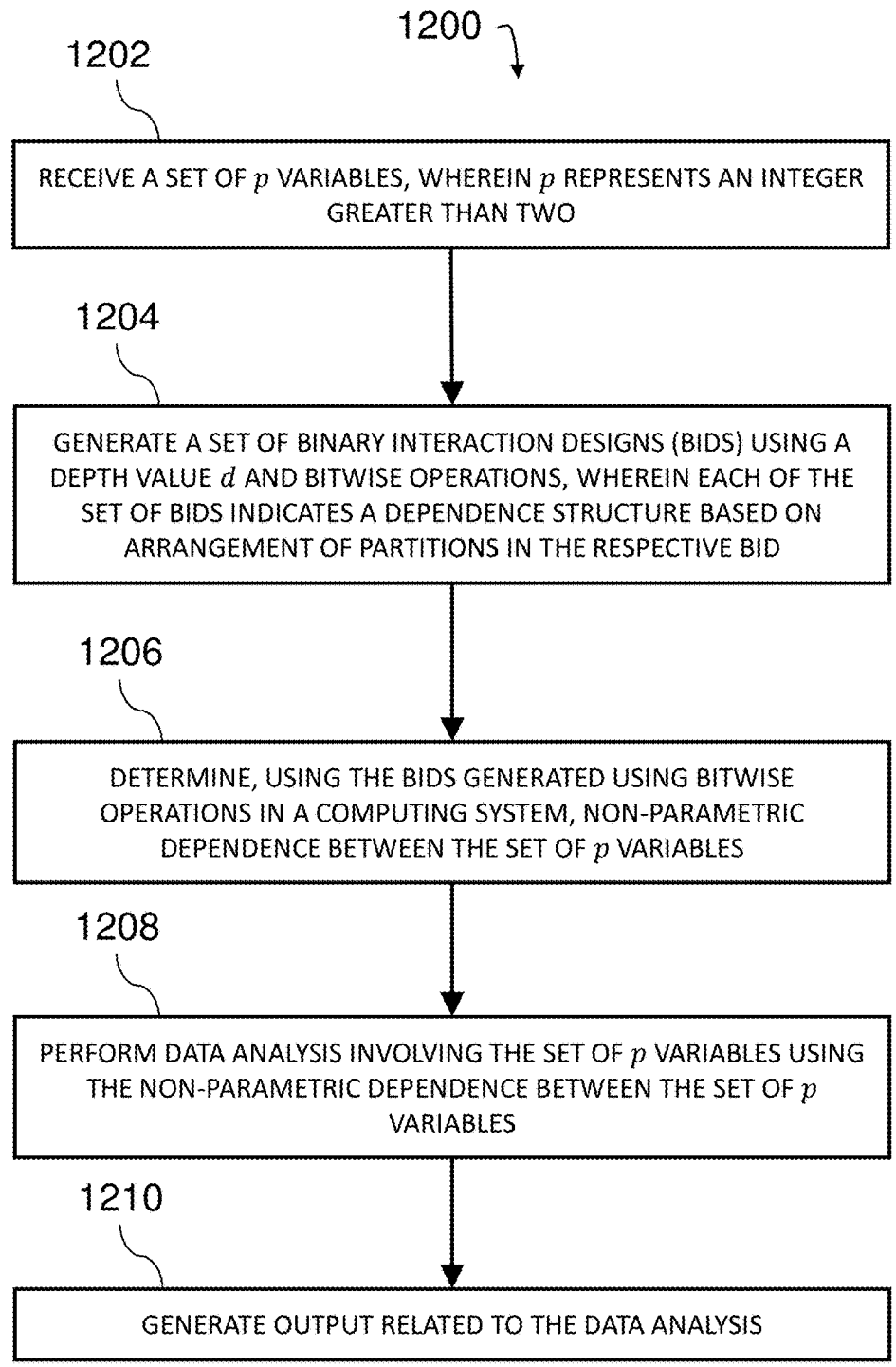
FIG. 12 is a diagram illustrating an example process for non-parametric dependence detection using bitwise operations in a computing system.

FIG. 12 is a diagram illustrating an example process 1200 for non-parametric dependence detection using bitwise operations in a computing system according to an embodiment of the subject matter described herein. In some embodiments, process 1200, or portions thereof, may be performed by or at system 1102, a computer communicatively connected to system 1102, or another node.

Referring to FIG. 12, in step 1202, a set of p variables may be received. In some embodiments, p may represent an integer greater than or equal to two.

In step 1204, a set of BIDs may be generated using a depth value d and bitwise operations. In some embodiments, each of the set of BIDs may indicate a dependence structure based on arrangement of partitions in the respective BID. Example dependence structures may include an 'X' shape dependence, a linear dependence, a zig-zag dependence, a chessboard type dependence, or a circular dependence.

In step 1206, non-parametric dependence between the set of p variables may be determined using the BIDs generated using bitwise operations in a computing system.

In some embodiments, determining non-parametric dependence between the set of p variables may include: for each BID, for a sample size n, and for n p-tuples, wherein each p-tuple contains a set of values for the set of p variables: determining an amount of p-tuples located in a first partition type of two partition types in the respective BID; and computing a probability value based on the amount of p-tuples located in the first partition type, wherein the non-parametric dependence between the set of p variables is determined when the probability value is equal to or exceeds a threshold value.

In step 1208, data analysis involving the set of p variables using the non-parametric dependence between the set of p variables may be performed. For example, system 1102 and/or DDM 1106 may be configured for identifying drug interactions or performing medical screening by identifying a dependence structure among a number of variables based on a significant amount of data related to medical tests, surveys, and/or evaluations. In another example, system 1102 and/or DDM 1106 may be configured for performing speech recognition by identifying a dependence structure among a set of variables (e.g., speech sounds) based on a significant amount of data related to human speech samples.

In step 1210, output related to the data analysis may be generated. For example, system 1102 and/or DDM 1106 may be configured for outputting reports and/or performing actions based on performed data analysis. In this example, system 1102 and/or DDM 1106 may be configured to perform Go, Chess, or another game and may identify dependence among a set of variables (e.g., possible self moves, possible opponent's moves, historical outcomes) to create or provide a current move or set of moves for the game.

In some embodiments, performing data analysis may include astronomy related analysis, genetic related analysis, pattern recognition, image recognition, speech recognition, medical related screening, or randomness testing. For example, system 1102 and/or DDM 1106 may be configured to utilize a machine learning algorithm for autonomous driving or another task. In this example, the machine learning algorithm may include a data analysis function that identifies a dependence structure among a set of variables (e.g., car feedback, environmental feedback, etc.) for determining a preferred or acceptable amount of braking, turning, or acceleration. Continuing with this example, the machine learning algorithm may also use a dependence structure among a set of variables (e.g., traffic, user preferences, historical data, etc.) for determining a preferred route of travel for a given destination.

In some embodiments, the covariate space of each BID may be divided evenly between two partition types, wherein each partition may be of a width $$\frac{1}{2^d}.$$

For example, each BID may be divided among partitions, where one type of partitions is represented by 1s and another type of partitions is represented by 0s. In this example, each partition type may be represented by a different color, e.g., blue or grey for a first partition type and white for a second partition type.

In some embodiments, generating a set of BIDs using a depth value d and bitwise operations may include constructing $2^d-1$ configurations for a dimension, where the $2^d-1$ configurations may be generated from a d number of basic configurations.

In some embodiments, one basic configuration may be computed using NOT ($A_i$ XOR ($A_i$<<(1<<(d−i)))), wherein $A_i$ may be a preceding basic configuration, XOR may be a logical exclusive or operation, << may be a bitwise left-shift operation, and NOT may be a logical negation operation.

In some embodiments, a non-basic configuration of $2^d-1$ configurations may be the dot product of at least two basic configurations.

In some embodiments, generating a set of BIDs using a depth value d and the bitwise operations may include calculating an empirical CDF for each variable.

In some embodiments, determining, using BIDs generated using bitwise operations in a computing system, non-parametric dependence between a set of p variables may include generating a multiplicity adjusted probability value using a Bonferroni correction and probability values associated with the BIDs, wherein the multiplicity adjusted probability value indicates the non-parametric dependence between the set of p variables.

In some embodiments, a threshold value may be based on a probability value associated with a binomial distribution of p-tuples among a first partition type of a BID.

It should be noted that system 1102, DDM 1106, and/or functionality described herein may constitute a special purpose computing device. Further, system 1102, DDM 1106, and/or functionality described herein can improve the technological field of computing, including, for example, data analysis, machine learning, deep learning, autonomous driving, game theory/playing, medical diagnosis, medical interaction identification, medical screening, astronomical body discovery, image recognition, speech recognition, big data processing, randomness testing, and/or cloud computing. By detecting dependence between multiple variables using bitwise operations, a computing system can perform more efficient and effective data analysis in a number of applications that benefit from identifying dependence or a related dependence structure for a data set.

Each of the following references is incorporated herein by reference in its entirety:

REFERENCES

[Benjamini & Hochberg (1995)] Benjamini, Y. and Hochberg, Y. Controlling the false discovery rate: A practical and powerful approach to multiple testing. *Journal of the Royal Statistical Society. Series B*, 570 (1):0 289-300, 1995.

[Fan & Lv (2008)] Fan, J. and Lv, J. Sure independence screening for ultrahigh dimensional feature space. *Journal of the Royal Statistical Society: Series B*, 700 (5):0 849-911, 2008.

[Galton (1886)] Galton, F. Regression towards mediocrity in hereditary stature. *The Journal of the Anthropological Institute of Great Britain and Ireland*, 15:0 246-263, 1886.

[Gretton & Gyorfi (2010)] Gretton, A. and Gyorfi, L. Consistent nonparametric tests of independence. *Journal of Machine Learning Research*, 110 (April):0 1391-1423, 2010.

[Gretton et al. (2005)] Gretton, A., Bousquet, O., Smola, A., and Scholkopf, B. Measuring statistical dependence with hilbert-schmidt norms. In *ALT*, volume 16, pp. 63-78. Springer, 2005.

[Hoeffding (1948)] Hoeffding, W. A non-parametric test of independence. *The annals of mathematical statistics*, pp. 546-557, 1948.

[Pearson (1895)] Pearson, K. Note on regression and inheritance in the case of two parents. *Proceedings of the Royal Society of London*, 58:0 240-242, 1895.

[Rukhin et al. (2001)] Rukhin, A., Soto, J., Nechvatal, J., Smid, M., Barker, E., and et al. A statistical test suite for random and pseudorandom number generators for cryptographic applications. 2001.

[Schweizer & Wolff (1981)] Schweizer, B. and Wolff, E. F. On nonparametric measures of dependence for random variables. *The annals of statistics*, pp. 879-885,1981.

[Székely et al. (2007)] Székely, G. J., Rizzo, M. L., and Bakirov, N. K. Measuring and testing dependence by correlation of distances. *The annals of statistics*, 350 (6):0 2769-2794,2007.

[Zhang (2016)] Zhang, K. Bet on independence. *arXiv preprint arXiv:*1610.05246, 2016.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications, and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for non-parametric dependence detection using bitwise operations in a computing system, the method comprising:
    at a dependence detection module (DDM) in a computing system for analyzing big data, wherein the DDM is implemented using at least one processor, wherein the DDM detects non-parametric dependence in the big data:
    receiving a set of p variables, wherein p represents an integer greater than or equal to two;
    generating a set of binary interaction designs (BIDs) using a depth value d and bitwise operations, wherein each of the set of BIDs indicates a dependence structure based on arrangement of partitions in the respective BID;
    determining, using the BIDs generated using bitwise operations in a computing system, non-parametric dependence between the set of p variables, wherein determining the non-parametric dependence between the set of p variables includes:
    for each BID and for a number n of p-tuples, wherein each p-tuple contains a set of values for the set of p variables:
        determining an amount of p-tuples located in a first partition type of two partition types in the respective BID; and
        computing a probability value based on the amount of p-tuples located in the first partition type, wherein the non-parametric dependence between the set of p variables is determined when the probability value is equal to or exceeds a threshold value;
    performing data analysis involving the set of p variables using the non-parametric dependence between the set of p variables; and
    generating output related to the data analysis.

2. The method of claim 1 wherein performing the data analysis includes astronomy related analysis, genetic related analysis, pattern recognition, image recognition, speech recognition, medical related screening, or randomness testing.

3. The method of claim 1 wherein the covariate space of each BID is divided evenly between the two partition types, wherein each partition is of a width $$\frac{1}{2^d}.$$

4. The method of claim 1 wherein generating the set of BIDs using the depth value d and the bitwise operations includes constructing $2^d-1$ configurations for a dimension, where the $2^d-1$ configurations are generated from a d number of basic configurations.

5. The method of claim 4 wherein one of the basic configurations is computed using NOT ($A_i$ XOR ($A_i$<<(1<<(d−i)))), wherein $A_i$ is a preceding basic configuration, XOR is a logical exclusive or operation, << is a bitwise left-shift operation, and NOT is a logical negation operation.

6. The method of claim 4 wherein a non-basic configuration of the $2^d-1$ configurations is the dot product of at least two of the basic configurations.

7. The method of claim 1 wherein generating the set of BIDs using the depth value d and the bitwise operations includes calculating an empirical cumulative distribution function (CDF) for each variable.

8. The method of claim 1 wherein determining, using the BIDs generated using bitwise operations in a computing system, non-parametric dependence between the set of p variables includes generating a multiplicity adjusted probability value using a Bonferroni correction and the probability values associated with the BIDs, wherein the multiplicity adjusted probability value indicates the non-parametric dependence between the set of p variables.

9. The method of claim 1 wherein the threshold value is based on a probability value associated with a binomial distribution of the p-tuples among the first partition type of a BID.

10. A system for non-parametric dependence detection using bitwise operations in a computing system, the system comprising:
    a computing system comprising:
        at least one processor; and
        a dependence detection module (DDM) implemented using the at least one processor, wherein the DDM detects non-parametric dependence in the big data, wherein the DDM is configured for:
            receiving a set of p variables, wherein p represents an integer greater than or equal to two;
            generating a set of binary interaction designs (BIDs) using a depth value d and bitwise operations, wherein each of the set of BIDs indicates a dependence structure based on arrangement of partitions in the respective BID;
            determining, using the BIDs generated using bitwise operations in a computing system, non-parametric dependence between the set of p variables, wherein determining the non-parametric dependence between the set of p variables includes:
            for each BID and for a number n of p-tuples, wherein each p-tuple contains a set of values for the set of p variables:
                determining an amount of p-tuples located in a first partition type of two partition types in the respective BID; and
                computing a probability value based on the amount of p-tuples located in the first partition type, wherein the non-parametric dependence between the set of p variables is determined when the probability value is equal to or exceeds a threshold value;
            performing data analysis involving the set of p variables using the non-parametric dependence between the set of p variables; and
            generating output related to the data analysis.

11. The system of claim 10 wherein performing the data analysis includes astronomy related analysis, genetic related analysis, pattern recognition, image recognition, speech recognition, medical related screening, or randomness testing.

12. The system of claim 10 wherein the covariate space of each BID is divided evenly between the two partition types and wherein each partition is of a width $$\frac{1}{2^d}.$$

13. The system of claim 10 wherein generating the set of BIDs using the depth value d and the bitwise operations includes constructing $2^d-1$ configurations for a dimension, where the $2^d-1$ configurations are generated from a d number of basic configurations.

14. The system of claim 13 wherein one of the basic configurations is computed using NOT ($A_i$ XOR ($A_i$<<(1<<(d−i)))), wherein $A_i$ is a preceding basic configuration, XOR is a logical exclusive or operation, << is a bitwise left-shift operation, and NOT is a logical negation operation.

15. The system of claim 13 wherein a non-basic configuration of the $2^d-1$ configurations is the dot product of at least two of the basic configurations.

16. The system of claim 10 wherein generating the set of BIDs using the depth value d and the bitwise operations includes calculating an empirical cumulative distribution function (CDF) for each variable.

17. The system of claim 10 wherein determining, using the BIDs generated using bitwise operations in a computing system, non-parametric dependence between the set of p variables includes generating a multiplicity adjusted probability value using a Bonferroni correction and the probability values associated with the BIDs, wherein the multiplicity adjusted probability value indicates the non-parametric dependence between the set of p variables.

18. The system of claim 10 wherein the threshold value is based on a probability value associated with a binomial distribution of the p-tuples among the first partition type of a BID.

19. A non-transitory computer readable medium having stored thereon executable instructions that when executed by at least one processor of a computer cause the computer to perform steps comprising:
at a dependence detection module (DDM) in a computing system for analyzing big data, wherein the DDM is implemented using at least one processor, wherein the DDM detects non-parametric dependence in the big data:
receiving a set of p variables, wherein p represents an integer greater than or equal to two;
generating a set of binary interaction designs (BIDs) using a depth value d and bitwise operations, wherein each of the set of BIDs indicates a dependence structure based on arrangement of partitions in the respective BID;
determining, using the BIDs generated using bitwise operations in a computing system, non-parametric dependence between the set of p variables, wherein determining the non-parametric dependence between the set of p variables includes:
for each BID and for a number n of p-tuples, wherein each p-tuple contains a set of values for the set of p variables:
determining an amount of p-tuples located in a first partition type of two partition types in the respective BID; and
computing a probability value based on the amount of p-tuples located in the first partition type, wherein the non-parametric dependence between the set of p variables is determined when the probability value is equal to or exceeds a threshold value;
performing data analysis involving the set of p variables using the non-parametric dependence between the set of p variables; and
generating output related to the data analysis.

20. The non-transitory computer readable medium of claim 19 wherein performing the data analysis includes astronomy related analysis, genetic related analysis, pattern recognition, image recognition, speech recognition, medical related screening, or randomness testing.

* * * * *